A. J. GRANGER.
SPRING WHEEL.
APPLICATION FILED FEB. 6, 1914.
1,126,447.
Patented Jan. 26, 1915.
2 SHEETS—SHEET 1.
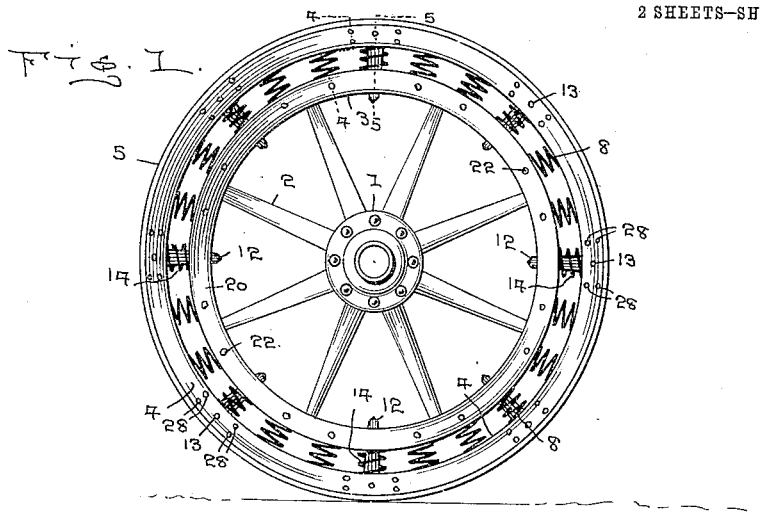
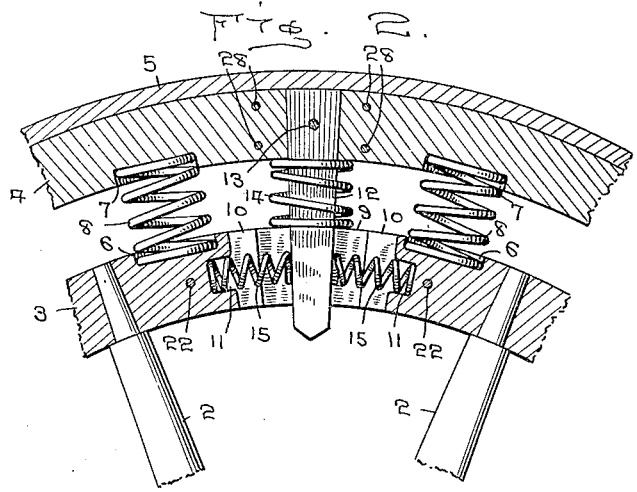
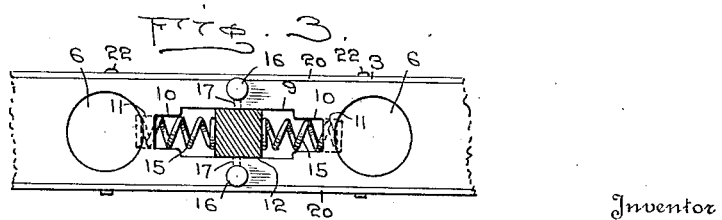
Witnesses
J. H. Reid
Inventor
A. J. Granger
By W. J. Fitzgerald & Co.
Attorney

A. J. GRANGER.
SPRING WHEEL.
APPLICATION FILED FEB. 6, 1914.

1,126,447.

Patented Jan. 26, 1915.
2 SHEETS—SHEET 2.

UNITED STATES PATENT OFFICE.

ARMAND J. GRANGER, OF SALIX, IOWA.

SPRING-WHEEL.

1,126,447.   Specification of Letters Patent.   Patented Jan. 26, 1915.

Application filed February 6, 1914. Serial No. 816,959.

*To all whom it may concern:*

Be it known that I, ARMAND J. GRANGER, a citizen of the United States, residing at Salix, in the county of Woodbury and State of Iowa, have invented certain new and useful Improvements in Spring-Wheels; and I do hereby declare the following to be a full, clear, and exact description of the invention, such as will enable others skilled in the art to which it appertains to make and use the same.

This invention relates to wheels and more particularly to wheels of the resilient type used principally upon automobiles and has for one of its objects the provision of means for preserving the resiliency of the wheel and the further provision of means for maintaining the resilient members of the wheels in strict circumferential alinement with each other.

A further object of this invention is the provision of means for resisting the lateral strains exerted upon a wheel.

A still further object of this invention is the construction of a wheel provided with means for relieving the same of any longitudinal stress exerted upon the same. And a still further object of this invention is the provision of means for permitting the easy repairing of the wheel or any of the parts constituting the same.

Another object of this invention resides in the fact that the same may be readily applied to most any ordinary form of wheel now in use by simply modifying the felly of the wheel to a slight degree wherein my invention is capable of being readily applied thereto.

Still another object of my invention resides in the fact that I provide a wheel consisting of few parts, easy to repair, efficient in purpose and which may be manufactured and sold upon the market at an exceedingly small cost.

Other objects and advantages of this invention will be hereinafter more clearly set forth in the specification and pointed out in the claim.

Figure 4:
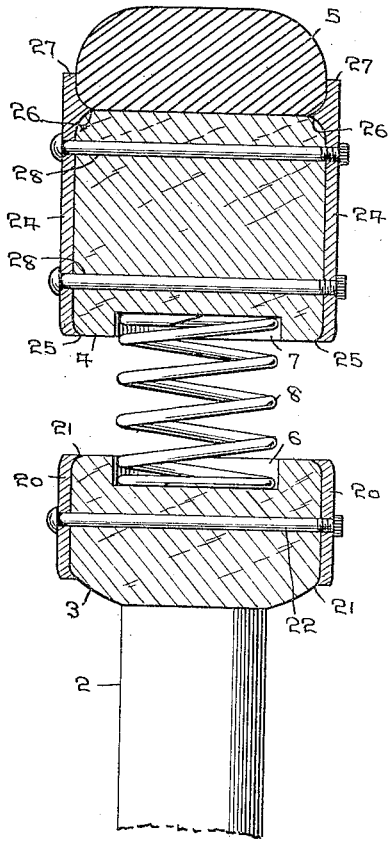
Figure 5:
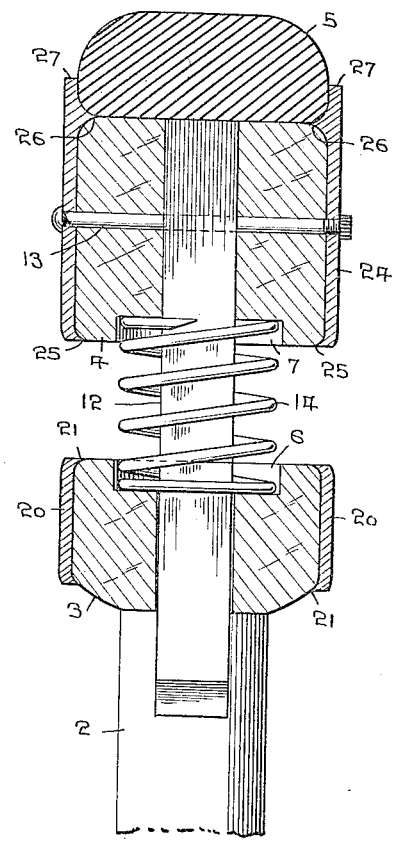

Figure 1 is a side view of my invention showing the wheel in its complete form ready for use. Fig. 2 is a vertical longitudinal sectional view of a part of the wheel, showing the mounting and assembling of the resilient members and the staying member. Fig. 3 is a top plan view of a portion of the inner rim of the wheel showing the provision of the apertures therein for the reception of the staying device. Fig. 4 is a transverse sectional view on line 4—4 of Fig. 1 upon an enlarged scale showing the mounting of the metallic reinforcing plates. Fig. 5 is a transverse sectional view on line 5—5 of Fig. 1 upon an enlarged scale and showing the mounting of the metallic tongues.

Referring to the drawings in which similar reference characters denote corresponding parts throughout the several views, 1 denotes the hub of the wheel provided with the spokes 2 and arranged upon the extremity of the spokes 2 is the inner rim 3, and around which is disposed the outer rim 4, the rim 4 being of greater diameter than the inner rim 3 thus providing an annular space therebetween, the outer rim 4 being provided upon the exterior periphery thereof with the cushion tire 5.

Arranged upon the periphery of the inner rim 3 are the spaced circular recesses 6, and also arranged upon the inner curved surface of the outer rim 4 are the spaced circular recesses 7 corresponding to the recesses 6 of the inner rim 3 and in registration therewith. In the respective recesses 6 and 7 of the rims 3 and 4 and interposed between the rims are the series of resilient springs 8, the springs 8 being interposed between the rims 4 and 5 and within the space therebetween and completely encircling the wheel and designed to provide resiliency for the wheel and to absorb any shocks to which the same may be subjected. The springs 8 being disposed radially of the wheel for the purpose.

Arranged within the inner rim between the points of the intersection of the spokes 2 and also between the resilient springs 8 are the elongated longitudinal slots 9 extending through the inner rim 3 in a radial direction and having the opposing reduced slots 10, 10, the rim 3 being also provided with circular recesses 11, 11 arranged in the opposite walls of the reduced slots 10, 10, in each of the series of the slots 9.

Fixedly mounted in the rim 4 and designed to pass radially inwardly through the slots 9 of the rim 3 and projecting a distance beyond the inner circumference of the inner rim 3 are the metallic tongues 12, the outer ends of which are secured in the outer rim 4 by the bolts 13, and encircling the metallic tongues 12 and within the space between the inner rim 3 and the outer rim 4 is the radially disposed resilient springs 14. The inner portions of the tongues 12 are designed to be slidably mounted within the elongated slots 9 and capable of longitudinal but not lateral movement therein, that portion of the tongues 12 within the slots 9 being provided at each side thereof with the cushion springs 15, 15, each of which have one of their ends bearing at opposite sides upon the tongues 12 and the remote ends thereof seated within the circular recesses 11, 11 formed in the inner rim 3. All of the springs are seated in the respective recesses under compression.

For the purpose of lubricating the movable part of the tongues 12 within the slots 9, I provide transversely of the inner rim 3 and at each side of the tongues 12 the lubricating cups 16 provided with the passage 17 for directing the lubricant within the cups 16 to the bearing surfaces of the tongues 12 and the side walls of the slots 9.

Upon each side of the rim 3 is arranged the circular reinforcing plates 20, the inner edges of which are inwardly crimped over the edges of the rim 3 as shown at 21, and passing transversely through the rim 3 are the bolts 22 for retaining the reinforcing plates 20 securely upon the sides of the rim 3. The bolts 22 are designed to extend through the rim 3 at points at each end of the elongated slot 9.

Arranged at each side of the rim 4 are the reinforcing circular plates 24, the plates having their innermost edges inwardly crimped over the edges as shown 25, the plates 24 having formed thereon adjacent the outer edge thereof the annular rib 26, the purpose of this rib being to overlap the outer corners of the rim 4 and at the same time to prevent acute corners at that portion of the seat of the tire 5, the extending portions 27 of the plates 24 provide retaining flanges and prevent the lateral displacement of the tire 5 when mounted upon the wheel, for retaining the reinforcing plates 24 upon the rim 4 are provided the bolts 28, these bolts being arranged in pairs and designed to pass transversely through the rim 4, each pair being positioned at a point on each side of the metallic tongues 12 for retaining the reinforcing plates 24 fixedly secured upon the sides of the rim 4.

The manner in which the bolts 22 and 28 are positioned upon the wheel construction provides for the double function of the bolts from the fact that the same not only retains the reinforcing plates 20 and 24 upon the rim 3 and the rim 4 respectively, but the same being positioned at each end of the slot 9 in the rim 3 and at each side of the metallic tongues of the rim 4 additionally reinforces the rim 3 and the rim 4 at the points where rupture is most likely to occur in the wheel construction.

It is to be here noted that in the construction of my wheel I have provided for all conditions and stresses attending structures of this character. The provision of the recesses within the rims for retaining the resilient springs deserves notice. The tongues secured to the outer rim and being confined within the slots 9 of the inner rim 3 permitting longitudinal movement of either the outer rim 4 or the inner rim 3 relative to each other this movement being restricted or limited by the shock absorbing or cushion springs 15 at either side of the tongues 12 in the direction of the travel of the tongues is another feature, and the tongues 12 being designed to engage the sides of the slots 9 and extending entirely through the inner rim 3 permits the radial movement of the tongues 12 within the slots 9 but prevents any lateral movement whatsoever. It is, therefore, clearly obvious that the dangerous consequences resulting from the lateral stress exerted upon wheels of this character in rounding corners or curves in roadways is obviated and at the same time any longitudinal or circumferential stress upon either the outer rim 4 or the inner rim 3 will be compensated for by the springs 15, 15 at either side of the tongues 12 and at the same time vertical jars or shocks to which wheels are subjected is relieved through the interposition of the resilient springs 8 between the inner rim 3 and the outer rim 4. The provision of the circular metallic reinforcing plates 20 and 24 together with the retaining bolts 22 and 28 and the manner of positioning the same upon the inner and the outer rim of the wheel affords a most efficient structure for resisting the stresses to which the same is subjected.

Another feature of my invention is that any part of the same may be readily renewed or repaired without the necessity of procuring special parts or special tools and devices for replacing the parts therein or for removing the broken or worn part.

I desire to further set forth other important advantages attained by my wheel construction, wherein by the use and arrangement of the reinforcing plates and the retaining bolts, the rims may be formed of a comparatively slender rim of wood and at the same time be sufficiently stable to withstand the sudden pressure of shocks at any point of its periphery, and by forming the rims of wood the wheel will be practically noiseless and quieter than if the same were made of metal and in constant contact with the metallic resilient springs.

A still further advantage is derived by the manner of mounting the cushion springs within the inner rim at each side of the metallic tongues. These springs are not only provided for cushioning the tongues to coact with the resilient springs for carrying the load and absorbing shocks, but are also designed for preventing the loss of power caused by the constant resisting force offered which is due to the compression of each successive resilient spring during the course of travel of the wheel, and this is a very important feature of my invention.

While I have shown and described the preferred embodiment of my invention I hereby reserve the right to make such changes and alterations therein as I may deem expedient from time to time and which will not depart from the spirit of this invention or conflict with the scope of the appended claim.

Having thus fully described my invention what I claim as new and desire to secure by Letters Patent is:—

In a wheel, comprising an inner rim having a plurality of circular recesses formed in the outer circumferential surface thereof, an outer rim surrounding said inner rim in spaced relation thereto and having a plurality of circular recesses formed in the inner circumferential surface thereof and in registry with the recesses of said inner rim, radially disposed compression springs interposed between said rims and having their ends seated in said recesses, said inner rim having a plurality of elongated rectangular slots formed therethrough and terminating in reduced end portions to provide shoulders, a plurality of radially disposed tongues secured in said outer rim and extending through the elongated slots in said inner rim, said tongues being approximately square in cross section and snugly engaging the said walls of said slots for maintaining said rims in strict longitudinal alinement with each other, said tongues being radially and circumferentially slidable within said slots but limited in their circumferential movement by said shoulders, radially disposed compression springs surrounding the said tongues, circumferentially disposed cushioning springs arranged in said slots and engaging said tongues at opposite sides thereof, seats formed in the end walls of said slots for retaining said cushioning springs in operative position, circular reinforcing plates secured upon the respective sides of said rims, and bolts for securing said plates upon said rims and for additionally reinforcing said rims at the points of greatest rupture.

In testimony whereof I have signed my name to this specification in the presence of two subscribing witnesses.

ARMAND J. GRANGER.

Witnesses:
O. G. FOSTIN,
E. B. LOW.

Copies of this patent may be obtained for five cents each, by addressing the "Commissioner of Patents, Washington, D. C."